Feb. 4, 1936.　　　　A. G. PAGE　　　　2,029,501
METHOD AND APPARATUS FOR DISTILLATION OF OIL
Filed Sept. 26, 1923
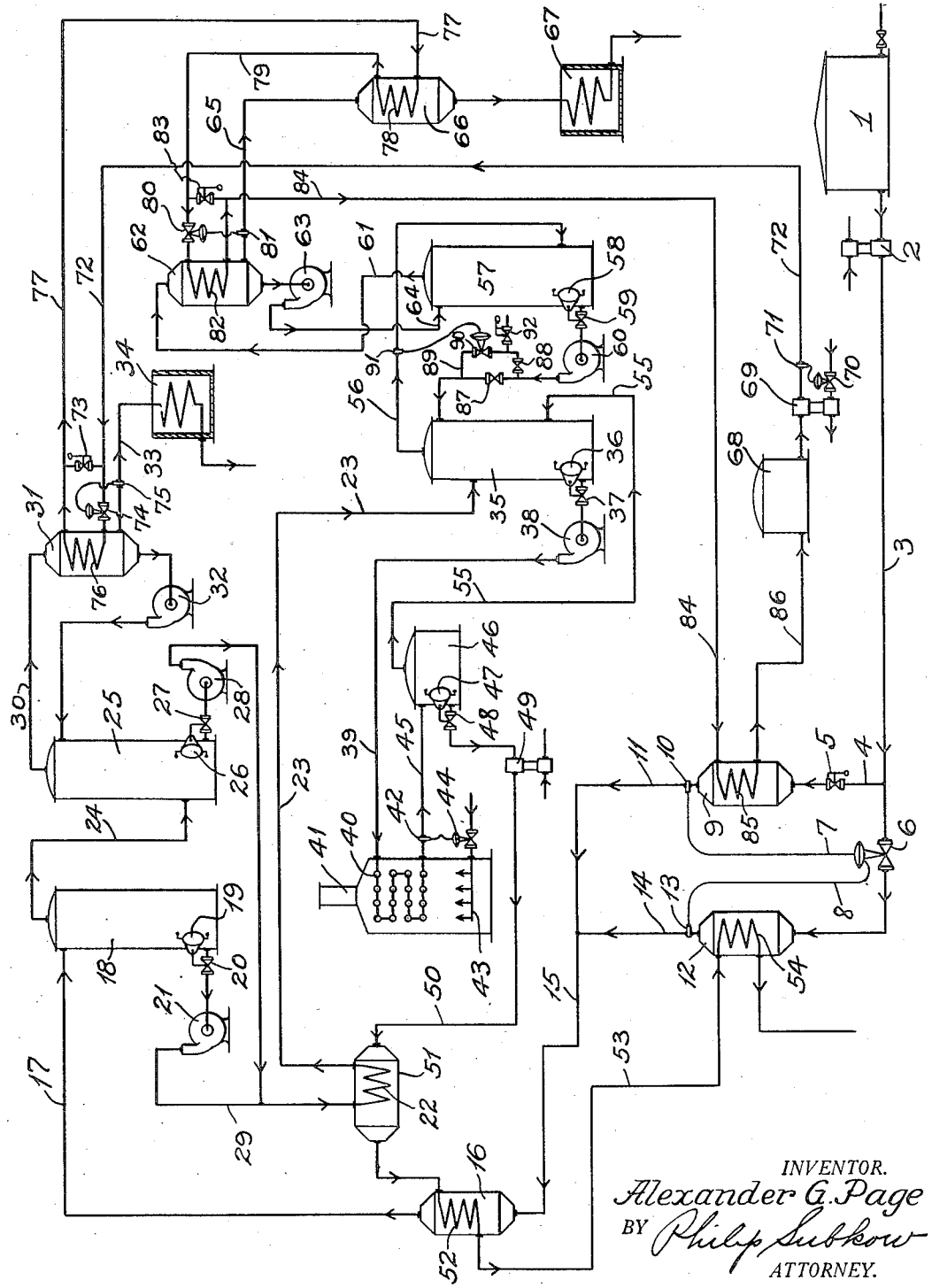
INVENTOR.
*Alexander G. Page*
BY *Philip Subkow*
ATTORNEY.

Patented Feb. 4, 1936

2,029,501

UNITED STATES PATENT OFFICE 2,029,501

METHOD AND APPARATUS FOR DISTILLATION OF OIL

Alexander Griffith Page, Los Angeles, Calif., assignor to Union Oil Company of California, Los Angeles, Calif., a corporation of California Application September 26, 1928, Serial No. 308,500

31 Claims. (Cl. 196—71)

Distillation process involving vaporization of a complex liquid, followed by a rectification of vapor including heat recovery steps from the various parts of operation necessitates accurate control of the various factors entering into the distillation and rectification stages.

The following controls are essential to obtain proper conditions for distillation and rectification:

The temperature of the oil undergoing vaporization must be controlled. In the vaporization of a complex mixture, such as crude oil or petroleum fractions, the composition of the vapors rising from the liquid depends upon the temperature of the liquid undergoing vaporization. In order to produce a maximum yield of a given product, it is essential that the temperature be high enough not only to vaporize this product from the liquid, but to vaporize also a considerable proportion of the heavier bodies. This is due to the fact that at any given temperature vapors rising from the complex liquid have a composition depending upon the partial pressure of the various components in the liquid and therefore upon the relative proportion of these components in the liquid. Having formed the vapors at a temperature sufficiently high to insure the vaporization of the components desired, it is necessary to separate the vapors into the desired and undesired components. This is accomplished by rectification. As is well known to those skilled in the art, in order to obtain a product having the desired quality, the vapors issuing from the rectification system must be at a definite and predetermined temperature. To produce this temperature, the partial condensation upon which is depended to obtain the reflux necessary to the rectification stage must be controlled so that the temperature of the vapors exiting from the partial condenser shall be at the desired point. Stating it in another way, in order to obtain a resultant liquid as an overhead from an overhead vapor from the rectification column, the composition of the vapor entering the column and the composition of the reflux returned to the top of the column must be controlled in quality. The former is controlled by controlling the vaporization of liquid and the latter is controlled by controlling the condensation of the vapors issuing from the column, that is, by controlling the temperature of the condensation.

If a system is to be in constant equilibrium, all the various factors must be invariant, or must vary in a definite relationship. Should any one of these controls vary, even slightly, the system is unbalanced and the fractions obtained are not the ones desired. In order to re-establish equilibrium, the variation must be corrected or the other factors must be varied in a definite manner.

It is the object of this invention to devise a process and apparatus by which distillation will be controlled entirely automatically and conditions once fixed will be constantly maintained irrespective of any variation which may occur accidentally, or the variation will be met by an automatic variation of the rest of the factors to re-establish equilibrium.

The essentials of good heat utilization in a distillation process involves the recovery of heat from the products and imparting this heat to the incoming charging stock. The use of charging stock as a cooling medium for the vapors in the condensation stages has been suggested. Two difficulties arise from such use, especially if the material is partially volatile at the temperature of condensation as is the case in distillation of crude oil or volatile liquids. One is that the stock at the temperature of condensation usually vaporizes partially. Another is that the cooling is dependent upon the rate of the feed. I have found that automatic control of condensation and, therefore, of rectification, is materially facilitated and made practical if the cooling medium can be controlled independently of the rate of feed and, also, the automaticity of the process is also materially facilitated and made practical if the cooling medium is substantially non-volatile at the temperature of condensation.

It is, therefore, an object of this invention to eliminate all variables from the distillation process so that conditions, when once fixed, shall remain constant.

Broadly stated, my invention comprises regulating the heating of the oil so as to maintain the oil automatically at a given temperature and be vaporized thereby; regulating the partial condensation of vapors from the rectifier so as to maintain a reflux to the rectifier at a constant and appropriate temperature for the composition of the product desired, or by automatically varying the several factors so as to obtain constant equilibrium conditions by circulating the cooling fluid at a controllable rate, independent of the in-put rate of the feed and, also, using a cooling fluid of a non-volatile character at the temperature of condensation.

One of the specifically preferred embodiments which is inducive of the success of my invention is the cyclic circulation of the substantially non-volatile cooling medium through the condenser, through a cooling medium, into a storage and back to the condenser. By providing this cyclic circulation of a substantially non-volatile fluid, the above condensing conditions are obtainable.

Stating it more specifically, the invention resides in a distilling and condensing system, preferably for petroleum oil or like complex liquid, wherein a cooling liquid is used for condensation purposes and is cyclicly circulated through a closed circuit, said liquid being non-volatile at the temperatures employed so as to completely avoid volatilization thereof in every part of the system, the circulation of the liquid being controlled to regulate the rate of heat exchange and to insure proper temperature ranges in the various stages with consequent production of the desired fractions.

In a preferred embodiment, the temperature control is automatic. The rate of heat exchange may be regulated by controlling the rate of circulation of the cooling liquid through the cooling circuit, as by means of automatic temperature controlled flow regulators which insure exactly the desired amount of cooling in each cooling or condensing device employed in the system. Preferably heat is applied to preheat the feed stock in proportion to the amount of heat absorbed in the condensation stages, and in a practical embodiment this is accomplished by cooling the cooling liquid by heat exchange with the feed stock. Two functions are thereby accomplished, namely, preheating the feed and properly cooling the circulating cooling liquid.

This invention will be better understood by reference to the accompanying drawing which shows a schematic arrangement of an apparatus for carrying out this process;

Charging stock, such as crude oil, contained in tank 1 passes by pump 2 through line 3 and split through line 4 and loaded valve 5 and through thermostatically controlled valve 6 to pass in parallel through heat exchangers 9 and 12 and through lines 11 and 14 to unite in line 15. In line 11 is positioned a pyrometric element 10 and in line 14 is positioned a pyrometric element 13. 10 is connected by 7 to the upper side of the diaphragm of the differential thermostatic valve 6 while 13 is connected by line 8 to the under side of diaphragm valve 6. This valve is further described herein.

The oil in line 15 is passed through heat exchanger 16 to be introduced in vaporizer 18. Unvaporized material passes from 18 through valve 20 controlled by level control 19 which acts to maintain a predetermined level in 18. The centrifugal pump 21 is of sufficient capacity to take the maximum amount of oil to be removed from 18 and therefore cooperates with level control 19 to maintain the oil at the proper level in 18. Pump 21 then passes the oil through heat exchanger element 22 and line 23. The vapors from 18 pass to line 24 to be introduced into fractionating column 25. The condensate in this fractionating tower passes through 27 controlled by the level control 26 and through pump 28 to be united with the oil in 29 from 21 to pass through 22. The overhead vapors from the fractionating tower 25 pass through line 30 into partial fractionating condenser 31 to form a condensate which is returned by centrifugal pump 32. The uncondensed material then passes through 33 to be condensed in condenser 34. The commingled stream in line 23 passes into exhausting column 35. The tower acts both as an exhauster and a rectifying column. In the upper part of the column, i. e. above the point of introduction of 23 it is a rectifying column. The liquid material in 35 collects in the bottom thereof and is controlled by level control 36 and valve 37 and is passed by the centrifugal pump 38 through heater coil 40 positioned in furnace 41 which is heated by burner 43, fuel to which is controlled by the thermostatically controlled valve 44 responsive to the pyrometric element 42 on the discharge side of the coil. The heated oil then passes through 45 into vaporizer 46. The unvaporized residuum collects in 46 regulated by a level control 47 and is discharged through valve 48 by pump 49 into line 50 passing to heat exchangers 51 and 52 and 54 via 53 to be discharged to storage or to further treatment. The vapor issuing from 46 passes through line 55 to be introduced into the bottom of exhausting column 35, passes countercurrent to the oil introduced via 23. The overhead vapors pass in line 56 into the fractionating column 57. The reflux condensate in 57 maintained to a proper level by level control 58 discharges through valve 59 by way of centrifugal pump 60 into the top of the exhausting column 35 to act as a reflux and be revaporized. Vaporized material from 57 passes to partial condenser 62 and condensate is returned by way of centrifugal pump 63 as a reflux to 57 via line 64. The uncondensed material from 62 passes to 65 and is condensed in condensers 66, 67. 67 may be either a condenser or a cooler.

Provision is made for drawing off a fraction of the liquid returned from 57 if this is desired. By-pass valves 87 and 88 are provided to operate the by-pass 89. Valve 87 is closed and 88 is opened. In by-pass 89 is a thermostatic valve 90 responsive to the pyrometric element 91 in line 56. A by-pass and loaded valve 92 is also provided.

The cooling circuit will now be described.

The cooling medium is maintained in tank 68 and is pumped by pump 69, the operation of which is controlled by throttle valve 70 on the steam line to the pump. This valve 70 is responsive to a pyrometric element 71 positioned on the discharge side of the pump 69. Cooling medium is then pumped through 72 and is split through loaded valve 73 and thermostatically controlled valve 74 responsive to pyrometric element 75 positioned in line 33. Part of the stream, therefore, passes through 76 in indirect heat exchange and out of contact with the vapors passed into partial condenser 31 and unites with the stream passing through 73 in 77. The combined stream then passes through coil 78 also out of contact with the vapors passed into condenser 66 and then into line 79 and is split by way of loaded valve 83 and thermostatically controlled valve 80 responsive to the pyrometric element 81 positioned in line 65. The stream, therefore, passes through 82 in indirect heat exchange and out of contact with the vapors passed into partial condenser 62 and unites with the stream through 83 in line 84. The combined stream then passes through cooling coil 85 in indirect heat exchange and out of contact with crude oil passed into heat exchanger 9 and is returned via 86 to the tank 68.

Mention may be made of the character of the thermostatic control valves 44, 70, 74, 80 and 90. These are any of the well known thermostatic valves which operate to open and close responsive to a change of temperature. They may be of the pressure diaphragm type wherein a rise in temperature causes an increase in air pressure in a tube passing to one side of the diaphragm which causes the valve to close in response to increase in pressure, therefore, an increase in temperature, or vice versa. Such valves are a common type as will be recognized by those skilled in the art. As shown, all of the valves operate to open on increase in temperature at their respective pyrometric elements. When the temperature drops they will close a predetermined amount. The amount of opening at any temperature and the degree of opening for any rise in temperature can be set on these valves. Such valves are well known. In the drawing, the valves are shown schematically only.

The valve 6 is of a balanced valve of the above type wherein the pressure from two pyrometric elements is directed opposite each other against the diaphragm. The valve will then open and close responsive to difference in pressure and, therefore, difference in temperature at these points, specifically as shown at 10 and 13. The amount and direction of opening or closing of the valve will depend upon the difference in temperature. As shown, if 10 is at a higher temperature than 13, the valve will close, if 13 is higher than 10, the valve will open. Such valves are well known.

The loaded valves 5, 73, 83 and 92 are ordinary loaded valve or block valve type, which create a back pressure to aid operation of the thermostatic valves. The level control 19, 26, 36, 47, and 58 operating valves 20, 27, 37, 48 and 59 are of conventional types.

The operation of the device is as follows: (A specific example will be given to aid in the explanation, but it will be understood that this example is merely an illustration to indicate the operaton of the device and process and not a limitation of my invention).

Crude oil of 28° A. P. I. at a predetermined rate is passed through line 3 and is split through exchangers 9 and 12. Valves 5 and 6 are so set that the temperatures at 13 and 10 shall be maintained the same. In 9 the oil is heated by the heated cooling medium passing through 85 and in 12 it is heated by the partially cooled residuum passing through 54. In other words, the stream is split so that the heat picked up by each fraction will raise the temperature of each stream to the same level, for example, the temperature at 10 and 13 will be substantially 160° F. The combined stream will then pass through heat exchanger 16 to pick up as much heat as possible from the residuum passing through 52. The temperature of the oil passing through 16 will be raised to approximately 345° F.

The thus preheated oil is then introduced into the primary vaporizing column 18 where it is flashed to remove the material volatile at that temperature. The vaporized material is then fractionated in rectifying column 25. This rectification is controlled by the control of the cooling fluid so that the vapor temperature is 175° F. All of the reflux formed in the partial condenser is returned by means of centrifugal pump 32, which is of sufficient capacity to take the maximum flow. The unvaporized material from the vaporizer 18 and the liquid condensate in 25 are passed respectively through pumps 21 and 28, and passed through exchanger 22 and introduced into the exhausting column 35. The provision of the level controls 19 and 26 and the provision of the centrifugal pumps 21 and 28 ensures the constant passage of all liquid irrespective of the variations in oil flow. The liquid from vaporizing tower 35 is then passed through pump 38 into the heating coil 40. The heating of this coil 40 is so controlled by the pyrometric element 42 and valve 44 to produce an exit temperature at 42 at 580°. The unvaporized residuum withdrawn by 49 is passed to heat exchangers 51, 16 and 12. The vapors from 45 enter into 35 to pass countercurrent to the liquid therein and the vapors from 35 are fractionated in 57 as previously described, the fractionation being so controlled by means of cooling fluid passing through 82 to maintain vapor temperature at 81 of 340° F. It will be seen as described, this process produces three fractions; a primary light gasoline at 84 of about 60° A. P. I.; a heavier gasoline at 67 of 46° A. P. I.; and a residuum through 53 of about 18° A. P. I. It will be obvious to the man skilled in the art that additional fractions could be withdrawn, as for instance, instead of returning the fractions through 60 to 35, this may be sent to storage to produce a gas oil fraction or fractions of that character. To permit this, valve 87 is closed and 88 is opened and reflux is returned to column 35 in order to maintain a predetermined temperature at 91, and the rest sent by the by-pass valve 92. In the specific example given no gas oil is removed, the system being operated to produce two grades of gasoline and fuel oil. If a gas oil cut is desired, the temperature on the outlet of the oil heater is raised to 625° F. and the reflux to tower 35 is so controlled as to maintain a temperature at 91 equal to 475° F. Additionally, by raising the temperature at 42 and a provision of several fractionating columns, such as 57 in series, various lubricating cuts, gas oil cuts and fractions may be obtained if a proper crude is being distilled. Care must be taken in this latter case so that the temperature of the residuum passes through the various heat interchanges which shall not be too low to congeal the same. This will be obvious to those skilled in the art.

Attention is now drawn to the operating features of this invention by which this process is maintained automatic.

One of the important factors which makes the constant equilibrium possible is that the condensing characteristics in this system automatically compensate for any fluctuations in character or material to be condensed and in such sporadic variables as atmospheric temperatures. It is obvious that in the design of a system the condensing capacity and function must be fixed. This is usually determined by providing an adequate condensing surface at the requisite place. In determining the amount of condensing surface the heat absorptive characteristic of the cooling fluid passing through cooling tubes must be known. This must remain invariant, otherwise, the original design will not meet the conditions. Thus, if a cooling fluid vaporizes in the tubes, we would no longer have the predetermined heat interchange since the absorptive characteristic of a mixture of vapor and liquid passing through a tube is entirely different from that of a liquid alone. When this vaporization occurs, the heat absorption is sporadic and non-controllable. The requirement as above described is, therefore, to maintain the heat absorption characteristic of the condensing material constant by providing heat absorption fluid which will not vaporize to any appreciable amount at the temperature of condensation. When so provided, condensation is absolutely controllable to produce condensing temperatures at any desired fixed point, it being merely necessary to increase the rate of flow in a predetermined manner. The heat absorption characteristic being fixed, a definite increase in volume or flow will cause a predetermined increase of absorption of heat. Provision is made, therefore, in this system for automatically varying the rate of flow through the condensing surface to maintain any exit temperature at a predetermined level by using a cooling fluid which will not vaporize at the temperature of condensation. However, since the amount of cooling fluid necessarily depends not only upon the heat it must absorb, but also upon its entering temperature into the heat exchange surface, provision is made for varying the rate of flow responsive to its own temperature. This is provided in this system by controlling the operation of circulating pump 69 by means of a pyrometric element 71. As the temperature at 71 rises valve 70 opens to speed up the pump a predetermined amount in accord with the said rise of temperature. The original design of this system is such that the amount of material to be circulated from 68 is regulated to provide the requirement for the total heat absorbing surface. The variation in amount of cooling fluid necessary in relation to the varying temperatures of the cooling fluid 68 is easily determined as will be obvious to those skilled in the art. The valve 70 and the thermostatic element 71 are so set that the correct amount of cooling fluid is circulated for any temperature thereof.

Since the quality of the fractions produced depends upon the vaporizing temperature of the liquid undergoing distillation and on the temperature of the vapor exiting from the partial reflux condenser of the fractionating column, controls at these two points are essential for constant equilibrium. In the system as described, the distillation temperature is regulated by controlling the exit temperature from the heater. No effort is made to control the primary vaporization in 18. The latter merely acts to remove any vapors formed. Provision, however, is made to segregate from the vapors thus formed only those that may be desired. The rest is returned to the second distillation stage in which vaporization is controlled as described above. This simplifies the system and takes advantage of efficient heat recovery.

The next stage of control to make the system produce the fractions of desired quality is the control of fractionation. This is made possible by controlling the vapor temperature leaving the partial reflux condenser by passing the requisite amount of cooling fluid therethrough. Provision is therefore made for this by providing a thermostatically controlled valve in the line and a by-pass. The loaded valve on the by-pass permits of accurate working of this thermostatic valve and to pass an amount of cooling fluid suited to the requirements therefor.

The provision of centrifugal pumps on the reflux return lines makes possible the return of all the reflux irrespective of the amount formed without any attention. They are of such capacity and run at such speed as to return the maximum amount formed. Then any fluctuation is taken care of.

The circulation of a proper amount of cooling fluid automatically responsive to the temperature desired to be obtained will obtain the desired control.

The heated circulating fluid is then returned to the cooler 85 in a closed cycle into tank 68. It is obvious that the temperature in 68 will, therefore, depend not only upon fluctuation in heat absorption occurring in the various condensers but also upon the rate of flow of the oil through the cooler 85. It is to provide for these fluctuations that the control of the pump 69 is herein shown. In the specific example the maximum temperature which is attained by the circulatory fluid is at 82. (In the specific example the temperature of the vapors at this point is about 380° F.). A gas oil fraction having an initial boiling point above this temperature may be used as the circulating cooling fluid. Should much higher temperatures be desired and cooling fluids which do not vaporize at such temperatures be unavailable, the fluid may be kept under sufficient pressure to maintain it in liquid phase.

Attention is also called to the provision for the maintenance of equal temperatures at points 10 and 13. By maintaining the temperature at 10 and 13 identical, the cooling effect at 54 and 85 will be maintained at its maximum level. The functions of the feed as a cooling fluid in these heat exchangers is two-fold; one, to cool the circulating cooling fluid from 84 to as low a point as possible; two, to pick up as much heat from 54 as possible. Since the operation of one is at the expense of the other, the optimum balance is maintained by providing an equal temperature at 10 and 13. The combined stream is then passed through 16 where it is allowed to pick up whatever heat it can. The further heating of the oil is thereafter controlled to maintain constant exit temperature at 42 as described. There is a maximum conservation of heat since the cooling fluid circulates in cyclic fashion and all the heat imparted to the oil in the heater 41 and 52 except that lost by radiation, an amount which is reduced to a minimum by insulating the system, is returned to the incoming crude by an independent circulating system. The independent circulatory system has the additional feature that the heat in the vapors is imparted to the incoming feed without causing the condensation to be dependent on the flow of incoming feed. If the incoming feed were to be used as the vapor cooling fluid, fluctuations in flow of feed would cause fluctuations in condensation which would act to make automatic control difficult, if not impossible.

It will be seen that as herein described, the distillation system is absolutely automatic and fractions of constant characteristics are obtained, and since it is automatic, the operation will be at maximum efficiency. Any fluctuations which may occur in the flow of the oil, or accidents in condensation, such as always occur by variations in atmospheric temperature, are automatically compensated.

It remains but to describe the operation of the system when the quality of the crude oil or the material to be distilled changes. It will be understood that in the distillation of a complex mixture such as crude oil or any liquid composed of a large number of fractions the composition of the vapors formed depends both on the temperature and the relative proportions of the various fractions in the material to be distilled. In the above system, the temperature of distillation is always sufficiently high to insure the vaporization of not only the desired gasoline and gas oil fractions but considerable of the fractions heavier than gas oil. Suppose then the crude oil changes so as to contain a smaller percentage of gasoline fractions. If the controls on the system are not altered, it will appear immediately that a larger proportion of the oil will be removed from the system as residuum and a smaller proportion of the oil will be condensed as gasoline in condensers 31 and 62. It will then be obvious that the crude oil passing into vaporizer 18 will be at a higher temperature than previously, due to the fact that it is now in heat exchange with a larger amount of residuum. Consequently, with controlled refluxing to produce the desired gasoline in 34, it would necessarily follow that the temperature of the oil introduced into vaporizer 35 increases and a greater proportion of the material is being recycled through the heater. The tendency, therefore, is to increase the vaporization in 35 and to ensure sufficient vaporization of the desired fractions. The same occurs when the crude becomes richer in gasoline. In this case the residuum is smaller in proportion while the vapors are in larger quantity in proportion. The crude oil is then heated up to a smaller degree than previously while the circulating fluid is forced to abstract more heat than previously and this is provided by the automatic control on pump 69. The temperature of the material entering 35 through 23 is then diminished, but due to the fact that it contains a larger percentage of light bodies a proper amount of vaporization occurs but any accumulation of light bodies is prevented by circulating through heater 40, which as described before is at a temperature to insure vaporization of light bodies.

If the system is run by removing fractions through 92 then if the oil decreases in gasoline content without increase of temperature in the heater a greater proportion of this gas-oil portion may be found in the residuum. In like manner, if the gasoline content of the crude charged increases, then since a greater proportion of the gas-oil is vaporized and enters the tower 57, stripping of the charging stock is more efficient and a greater proportion of the stock is removed through 92.

It is obvious, of course, that this automatic control assumes that the crude does not vary to a very great extent in composition. Should, however, this occur, such as for instance, if a very heavy oil is to be run instead of a crude oil containing an average amount of gasoline, then the original setting of the temperature at 42 may not be sufficient to produce the necessary vaporization but the system need be varied merely by increasing the temperature at 42 without any other alteration to be operative for this material. It will be advisable, probably, when the charging stock changes in any material degree that this change of temperature at 42 be made in order that the system will run most efficiently. Since it is usual to charge this system from a tank and to switch to a second tank when that is empty and the characteristic of the material in each tank is known there need be no difficulty. However, the system will be maintained in equilibrium at all times and it will only be necessary to reset the temperature, and the process will continue from there on at the new conditions without interruption. In previous systems a change-over from one set of conditions to another meant the destruction of the original equilibrium and a period of waiting until the new equilibrium was established. During this period, which was always material, the system is out of equilibrium and the products are not usable.

The above is not to be taken as limiting my invention, but merely illustrative thereof. Various modifications and adaptations will occur to those skilled in the art within the scope of my invention.

I claim:

1. A method of distillation which comprises vaporizing a liquid, condensing the vapors by heat exchange with a cooling fluid and preheating the liquid, passing to said vaporization, by heat exchange with the cooling fluid passing from said heat exchange with said vapors.

2. A method of distillation which comprises vaporizing a liquid, condensing the vapors by heat exchange with a cooling fluid, circulating said cooling fluid through said heat exchange from a bulk supply to said heat exchange, pre-heating the liquid passing to said vaporization by heat exchange with the cooling fluid passing from said first mentioned heat exchange, and returning said cooling fluid to said bulk supply.

3. A method of distillation which comprises vaporizing a liquid, condensing the vapors by heat exchange with a cooling fluid and preheating the liquid passing to said vaporization by indirect heat exchange and out of contact with the cooling fluid passing from said heat exchange with said vapors.

4. A method of distillation which comprises vaporizing an oil, condensing the oil vapors by heat exchange with a cooling oil and preheating the oil passing to said vaporization by indirect heat exchange and out of contact with the cooling oil passing from said heat exchange with said oil vapors.

5. A method of distillation which comprises vaporizing a liquid, condensing the vapors by indirect heat exchange and out of contact with a cooling fluid and preheating the liquid passing to said vaporization by indirect heat exchange and out of contact with the cooling fluid passing from said indirect heat exchange with said vapors.

6. A method of distillation which comprises vaporizing an oil, condensing the oil vapors by indirect heat exchange and out of contact with a cooling oil and preheating the oil passing to said vaporization by indirect heat exchange and out of contact with the cooling oil passing from said indirect heat exchange with said oil vapors.

7. A method of distillation which comprises vaporizing a liquid, condensing the vapors by indirect heat exchange and out of contact with a cooling fluid, circulating said cooling fluid through said heat exchange from a bulk supply to said heat exchange, preheating the liquid passing to said vaporization by indirect heat exchange and out of contact with the cooling fluid passing from said first mentioned heat exchange, and returning said cooling fluid to said bulk supply.

8. A method of distillation which comprises vaporizing a liquid to form a vapor, rectifying said vapor, partially condensing the vapor to form a reflux for said rectification step, by heat exchange with a circulating cooling fluid, preheating the liquid passing to said vaporization stage by heat exchange with said cooling fluid passing from said partial condensation stage and controlling the said partial condensation by regulating the rate of circulation of the cooling fluid independently of the rate of said feed.

9. A method of distillation which comprises vaporizing a liquid to form a vapor, rectifying said vapor, partially condensing the vapor to form a reflux for said rectification step, by heat exchange with a circulating cooling fluid, and automatically regulating the flow of cooling fluid in heat exchange with said vapors by automatically by-passing a regulated portion of said cooling fluid to maintain the temperature of the uncondensed vapors at a constant and pre-determined point, pre-heating the liquid, passing to said vaporization stage, by heat exchange with the cooling fluid passing from said heat exchange.

10. A method of distillation which comprises vaporizing a liquid, condensing the resulting vapors, withdrawing unvaporized portion, circulating a cooling liquid to said condensation stage and passing portions of the liquid to be vaporized in heat exchange with said unvaporized portion and with said circulating medium passing from said heat exchange with the vapors.

11. A method of distillation which comprises vaporizing a liquid, condensing the resulting vapors, withdrawing unvaporized portion, circulating a cooling liquid to said condensation stage and passing portions of the liquid to be vaporized in heat exchange with said unvaporized portion and with said circulating cooling medium passing from said heat exchange with the vapors and controlling said heat exchange between said liquid to be vaporized and said unvaporized portion and between said liquid to be vaporized and said circulating cooling liquid so as to maintain the temperature of the said portions after said heat exchanges at the same temperature.

12. A process for absorbing heat from vapors of gasoline and higher boiling hydrocarbons which comprises circulating a heat absorbing fluid in indirect heat exchange relationship with said vapors out of contact therewith, maintaining the heat absorption characteristics of said heat absorbing fluid constant throughout said heat exchange by maintaining said heat absorbing fluid wholly in liquid state throughout said heat exchange.

13. A process for distilling and fractionally condensing petroleum oils which comprises heating the oil to a temperature to vaporize the fractions desired, passing the vapors to a fractional condensing device, circulating a cooling liquid through said device in a closed circuit and in indirect contact with said vapors, said liquid being non-volatile at the temperatures employed and being introduced to said device at a predetermined temperature to regulate the condensation to obtain a desired condensate, and cooling the cooling liquid received from said device.

14. A method according to claim 13 wherein the cooling liquid is cooled in said closed circuit by passing in heat exchanging relation with the stock to be distilled in such manner that the cooling liquid is cooled to a predetermined degree.

15. A process for distilling and fractionally condensing petroleum oils which comprises distilling the oil at a temperature to vaporize the fractions desired, passing the vapors to a fractional condensing device, circulating a cooling liquid through said device in a closed circuit and in indirect contact with said vapors, said liquid being non-volatile at the maximum temperatures to which it is subjected and being passed through to said device under conditions to cool the vapors to a predetermined degree and regulate the separation of vapors and condensate.

16. A method according to claim 15 wherein the cooling liquid is cooled in said closed circuit by passing in heat exchanging relation with the stock to be distilled in such manner that the cooling liquid is cooled to a predetermined degree.

17. A method for distilling and fractionally condensing petroleum oils comprising applying heat to distill off the desired fractions, said heat being applied in proportion to the quantity of desired fractions present in the stock, circulating a cooling liquid which is wholly non-volatile at the temperatures employed through a closed circuit in contact with said vapors for fractional condensation thereof, circulating said cooling liquid under control to cool the vapors to a predetermined degree, and cooling said cooling liquid after said vapors have been cooled and regulating the rate of circulation of said liquid responsive to the temperature of the uncondensed vapors to obtain a constant cooling effect.

18. A method for distilling and fractionally condensing petroleum oils comprising applying heat to distill off the desired fractions, said heat being applied in proportion to the quantity of desired fractions present in the stock, circulating a cooling liquid through a closed circuit in contact with said vapors for fractional condensation thereof, circulating said cooling liquid under control to cool the vapors to a predetermined degree and then passing said cooling liquid in said closed circuit in heat exchange relation with the incoming stock to be distilled to yield up heat to said stock in proportion to the amount of heat absorbed during condensation of vapors.

19. A method according to claim 18 wherein the cooling liquid is wholly non-volatile at the temperatures employed.

20. A method for fractionally distilling and condensing hydrocarbon oils comprising distilling off the desired fractions by the application of heat to the oils in amount governed by the amount of fractions desired, pressing the distilled vapors successively through a plurality of fractional condensers, circulating a cooling liquid which is wholly non-volatile at the temperatures employed in a closed circuit successively through said condensers, automatically controlling the temperature of said cooling liquid in certain of said condensers by controlling the rate of circulation of cooling liquid responsive to the temperature of the cooling liquid in said condensers to reduce the temperature of the vapors in each of said condensers to a predetermined degree, and cooling said cooling liquid after passage from the hottest condenser.

21. A method for fractionally distilling and condensing hydrocarbon oils comprising distilling off the desired fractions by the application of heat to the oils in amount governed by the amount of fractions desired, passing the distilled vapors successively through a plurality of fractional condensers, circulating a cooling liquid in a closed circuit successively through said condensers, automatically controlling the temperature of said cooling liquid in certain of said condensers by controlling the rate of circulation of cooling liquid responsive to the temperature of the cooling liquid in said condensers to reduce the temperature of the vapors in each of said condensers to a predetermined degree, and cooling said cooling liquid after passage from the hottest condenser by passing the same in heat exchanging relation with the incoming feed to be distilled to yield up to said feed an amount of heat in proportion to that absorbed in the condensers.

22. A method for fractionally distilling and condensing hydrocarbon oils comprising distilling off the desired fractions by the application of heat to the oils in amount governed by the amount of fractions desired, passing the distilled vapors successively through a plurality of fractional condensers, circulating a cooling liquid which is wholly non-volatile at the temperatures employed in a closed circuit successively through said condensers, automatically controlling the temperature of said cooling liquid in certain of said condensers by controlling the rate of circulation of cooling liquid responsive to the temperature of the cooling liquid in said condensers to reduce the temperature of the vapors in each of said condensers to a predetermined degree, and cooling said cooling liquid after passage from the hottest condenser by passing the same in heat exchanging relation with the incoming feed to be distilled to yield up to said feed an amount of heat in proportion to that absorbed in the condensers.

23. A process of distilling and fractionally condensing oils which comprises distilling the oils so that the vapor issuing from the still has a predetermined temperature, condensing the vapors wholly with a liquid by indirect heat exchange non-volatile at the temperatures employed, circulating said condensing liquid in a closed circuit, the temperatures of the vapors and of the condensing liquid being constant at predetermined points in the system.

24. A process of distilling and fractionally condensing oils which comprises distilling the oils so that the vapor issuing from the still has a predetermined temperature, condensing the vapors with a liquid non-volatile at the temperatures employed, circulating said condensing liquid in a closed circuit, the temperatures of the vapors and of the condensing liquid being constant at predetermined points in the system, and cooling the condensing liquid after condensation of the vapors by passing the same in heat exchanging relation with the incoming oil to be treated.

25. A process for distilling and fractionally condensing hydrocarbon oil which comprises, preheating said oil by heat exchange with a circulating oil, heating said oil to a predetermined temperature to vaporize said oil, automatically regulating the temperature to which the oil is preheated and to which the oil is heated to control said vaporization, fractionally condensing said oil vapors by heat exchange with said circulating oil and automatically controlling the temperature of condensation to control fractional condensation, said automatic regulation of preheating and condensing being effected by controlling the circulation of said circulating oil which is substantially non-volatile at the temperature of preheating and condensation.

26. A process for distilling and fractionally condensing hydrocarbon vapors which comprises cooling the vapors issuing from a successive number of stills in a successive number of heat exchangers connected respectively to the stills, the heat exchange medium being a liquid non-volatile at the temperature used, such heat exchange medium travelling in a closed circuit, absorbing heat from the vapors and giving up its excess heat by heat exchange relationship with incoming stock to be distilled.

27. A method according to claim 26 wherein the heat exchange with the incoming stock is independent of the rate of feed of said stock.

28. An apparatus for distillation comprising a vaporizing unit, means for introducing fluid to be vaporized to said unit, a condensing unit associated with said vaporizing unit, means for passing cooling fluid to said condensing unit and means for passing cooling fluid from said condensing unit in heat exchange to the fluid passing to the vaporizing unit.

29. An apparatus for distillation comprising a vaporizing unit, means for introducing fluid to be vaporized to said unit, a condensing unit associated with said vaporizing unit, a bulk supply for cooling fluid, means for passing cooling fluid from said bulk supply to the cooling unit and means for passing cooling fluid from said condensing unit in heat exchange with the fluid to be vaporized and means for returning said cooling fluid to the bulk supply.

30. An apparatus for distillation comprising a vaporizing unit, a condensing unit, connections therebetween, a vapor line from said condensing unit to a second condenser, a bulk supply for cooling fluid, means for circulating a cooling fluid from said bulk supply to said first condensing unit, means for regulating the flow of cooling fluid to said condensing unit responsive to the temperature in said conduit leading to said second condenser, means for passing said cooling fluid from said condensing unit in heat exchange with fluid passing to said vaporizing unit, means for returning the fluid from said first condensing unit to said bulk supply.

31. An apparatus for distillation which comprises a source of supply of oil to be vaporized, means for passing said oil at controllable rate through a plurality of heat exchange elements in heat exchange with unvaporized material passing from said distillation unit and in heat exchange with cooling fluid circulating in said distillation apparatus, means for introducing said feed material into a vaporizing element to separate the liquid into a vapor and unvaporized fractions, means for rectifying said vapor, means for commingling the unvaporized portion from the rectifying and from the vaporizing element, means for introducing said commingled fractions into a stripping tower to pass in counter-current with vapors generated from the unvaporized fraction in said stripping tower, means for passing said vaporized fractions from said stripping tower into a vaporizing element to generate the vapors to be introduced into said stripping tower, means for withdrawing the unvaporized portion from said last mentioned vaporizing element and means for passing said unvaporized portion to the first mentioned heat exchange element adapted to pass said unvaporized fraction in heat exchange with the incoming material to be distilled, means for removing the vapors from said stripping tower and rectifying same, means for returning at least a portion of the unvaporized portion from the last mentioned rectifying means into said stripping tower, means for condensing the vapors from said rectifying unit, a bulk supply for a cooling fluid, means for circulating said cooling fluid from said bulk supply into the aforementioned condensing unit and to the aforementioned heat exchange element in heat exchange with the incoming fluid to be vaporized and means for returning said cooling fluid back to said bulk supply.

ALEXANDER GRIFFITH PAGE.